(12) United States Patent
Crane et al.

(10) Patent No.: US 6,637,969 B2
(45) Date of Patent: Oct. 28, 2003

(54) SWIVEL

(75) Inventors: Clayton Crane, Seattle, WA (US); David Long, Puyallup, WA (US)

(73) Assignee: Robbins Tools, Inc., Solon, OH (US)

( * ) Notice: Subject to any disclaimer, the term of this patent is extended or adjusted under 35 U.S.C. 154(b) by 0 days.

(21) Appl. No.: 09/943,567

(22) Filed: Aug. 30, 2001

(65) Prior Publication Data

US 2003/0044225 A1 Mar. 6, 2003

(51) Int. Cl.[7] .......................... F16D 03/00; F16D 03/24
(52) U.S. Cl. .......................................... 403/78; 403/164
(58) Field of Search ............................... 403/2, 58, 60, 403/72, 78, 164, 165, 263, 409.1; 285/276, 272

(56) References Cited

U.S. PATENT DOCUMENTS

| | | | |
|---|---|---|---|
| 2,811,378 A | | 10/1957 | Kalista |
| 4,600,331 A | * | 7/1986 | Gray .......................... 403/165 |
| 4,664,205 A | | 5/1987 | Knighton et al. |
| 4,687,365 A | | 8/1987 | Promersberger |
| 4,749,192 A | * | 6/1988 | Howeth ...................... 285/276 |
| 5,273,372 A | * | 12/1993 | Friedmann et al. ........... 464/24 |
| 5,484,220 A | | 1/1996 | Lewis et al. |
| 5,494,367 A | * | 2/1996 | Epkens ....................... 403/164 |
| 5,529,421 A | | 6/1996 | Epkens |
| 5,607,248 A | | 3/1997 | Hasse |
| 5,697,768 A | * | 12/1997 | Mills |
| 5,772,350 A | | 6/1998 | Ferguson et al. |

OTHER PUBLICATIONS

Caterpillar Inc., Caterpillar Precision Seals, "Metal–Face Seals", pp. 1–12.

* cited by examiner

Primary Examiner—Lynne H. Browne
Assistant Examiner—Ryan M. Flandro
(74) Attorney, Agent, or Firm—Pearne & Gordon LLP

(57) ABSTRACT

A swivel for placing utility product with horizontal directional drilling techniques comprising a head piece and a tail piece rotationally mounted on the head piece. A bearing assembly of oppositely disposed units with high thrust capacity and self-alignment properties is mounted on a stub shaft integral with the head piece and enclosed by a shell body associated with the tail piece. A gap between the head piece and shell body is sealed with a metal face seal assembly. A juncture between the shaft and main part of the head piece is shaped to avoid a stress riser condition and a thrust washer has a configuration complimentary to the juncture to transmit forces between the head piece and bearing assembly. A joint between the tail piece and shell body is locked with a weld bead technique that enables the unit to be refurbished with reduced labor.

5 Claims, 2 Drawing Sheets

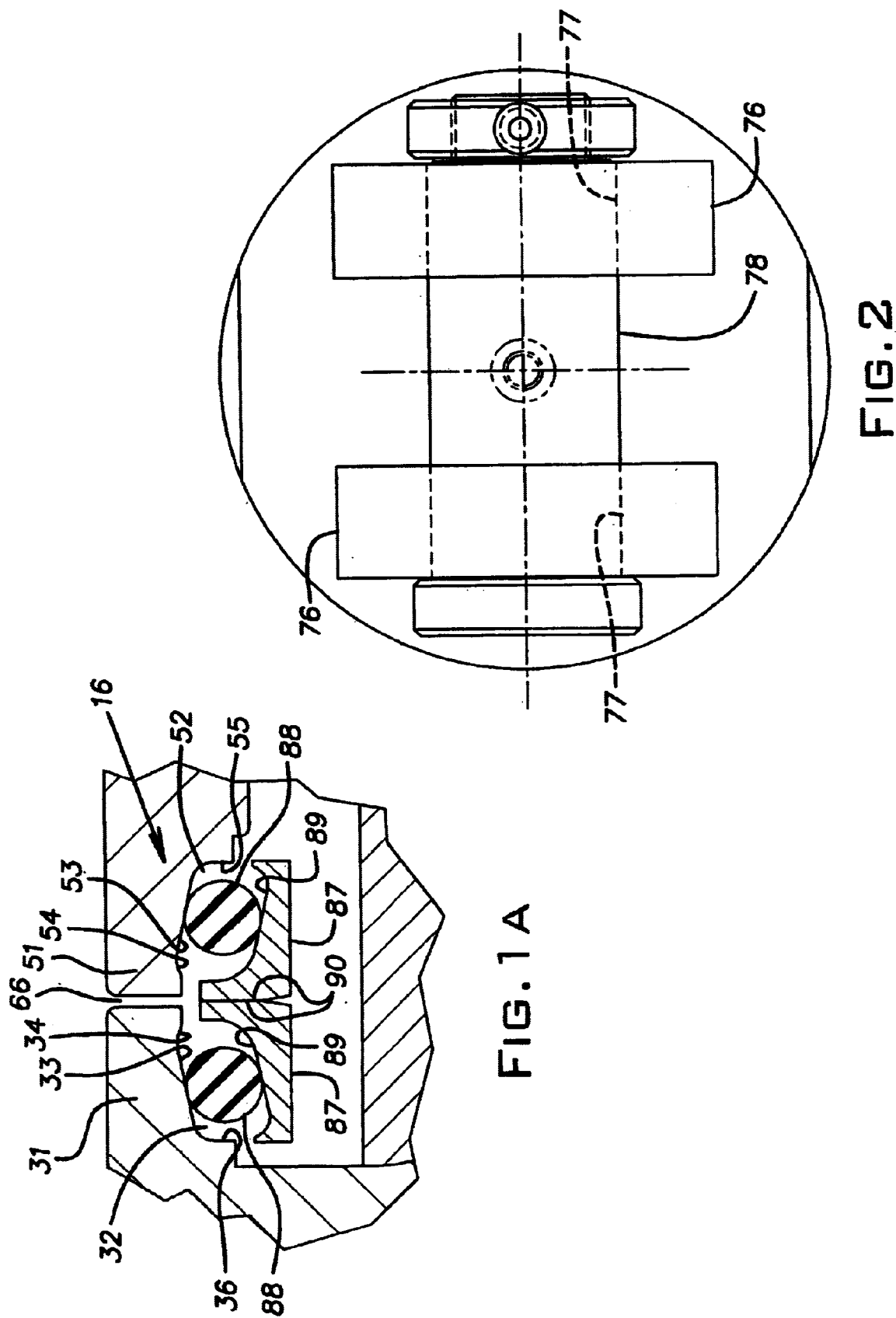

SWIVEL

BACKGROUND OF THE INVENTION

The invention relates to improvements in swivels for connecting utility products to pipe strings in horizontal directional drilling operations.

Horizontal direction drilling is increasingly popular because of increased demand for placement of utility product such as communications cable, power cable or conduit, infrastructure that obstructs traditional trenching methods, and technological advances in horizontal directional drilling. Activity in this field has demonstrated a need for a reliable coupling device to connect a drill or pipe string to a product line such as conduit for fiber optic cable. Typically, the product is installed by pulling the drill or pipe string back through the bore that has been created by various drilling and reaming methods. Coupling devices, commonly known as swivels, have been introduced to the industry. These swivels are intended to allow a pipe string to rotate while pulling the product without requiring the product to rotate. Rotation of the product could damage it. Existing swivel designs are prone to failure because of the harsh environment and high forces that are experienced in typical product installations. More specifically, the bore may be exposed to drilling fluid such as a mixture of water, bentonite and polymers known in the industry as "mud". This liquid is used as coolant for the cutting tools, holding the drilled hole or bore open and to lubricate the product being installed.

This liquid or mud can be destructive of the bearing seals and bearings typically found in commercially available swivels. Bearings may fail, not only from degradation or loss of lubrication due to seal failure, but also from heavy bending force loads on the swivel which the bearing structure is not capable of sustaining. Another significant problem with prior art swivels is their tendency to break under combined cyclic tensile and bending stresses that typically occur in use. These bending forces occur as the pipe string, swivel and product pass along a bore that deviates from a straight line such as where a hard formation or other obstruction or resistance may have been encountered during drilling operations. The nature of the work limits the physical size of the componentry in a swivel making it difficult to achieve satisfactory strength and durability.

SUMMARY OF THE INVENTION

The invention provides a swivel for use with horizontal directional drilling equipment for product installation that has improved performance, durability and maintenance characteristics. A swivel constructed in accordance with the invention has extended bearing life by inclusion of a type of bearing assembly that tolerates practical dimensional tolerances and inevitable bending deflections in the swivel components during use. The swivel incorporates a metal face seal between the rotating and non-rotating parts of the swivel to exclude solid and liquid contaminanats from the interior and to retain lubricant therein.

A cantilever or stub shaft supporting the bearing structure in the swivel has a large smooth fillet at its base to significantly reduce stress riser effects at this cross-section transition area. This area is capable of sustaining substantial tensile and compressive forces as well as large cyclical bending forces without failure in an extended service life. The swivel achieves a desired compactness by arranging the seal assembly around the shaft transition area. These elements, consequently, do not separately add to the necessary length of the swivel. Moreover, the seal assembly uses parts of the structure of the swivel itself to eliminate the need to make an outside diameter of the swivel larger than is required. The disclosed swivel is retained in an assembled state by a unique welding technique that is simple, reliable and avoids complicated and/or tedious labor when the swivel is disassembled and reassembled for regular maintenance and/or inspection and refurbishment.

BRIEF DESCRIPTION OF THE DRAWINGS

FIG. 1A is an enlarged cross-sectional fragmentary view of a seal area of the swivel; and FIG. 2 is an end view of the product end of the swivel taken from the reference direction indicated by the arrows 2—2 in FIG. 1.

DESCRIPTION OF THE PREFERRED EMBODIMENT

Figure 1:
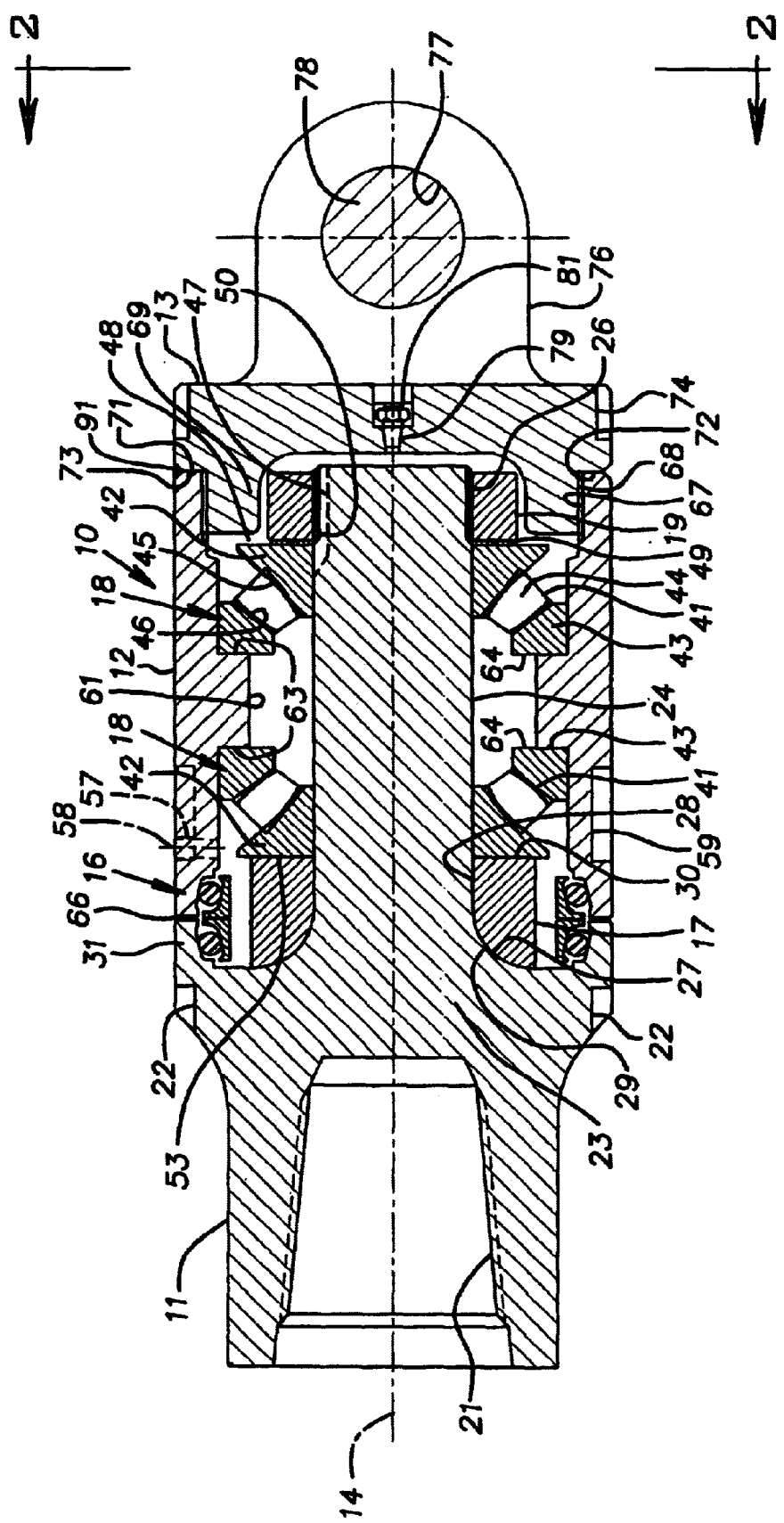
FIG. 1 is a cross-sectional view of a swivel of the invention taken in a longitudinal or axial plane.

Referring now to the figures, there is shown a swivel assembly 10 for coupling a drill or pipe string to a product such as a communications cable, power cable or conduit for the same. Typically, a pipe string will be positioned in a bore or hole with horizontal directional drilling techniques. At the down hole end of the drill string, the swivel can be connected between the drill string and the lead end of a product to enable it to pull the product back through the bore.

The swivel 10 includes a head piece 11, a shell body 12 and a tail piece 13 which are primarily round bodies that, in assembly, are all concentric with a common axis 14. Disposed within these bodies are a seal assembly 16, a thrust washer 17, bearing assemblies 18 and a nut 19, all concentric about the common axis 14.

The illustrated swivel assembly 10 is rated at 30 tons. The head piece 11 has an internally threaded bore 21 or "box end" with 2⅞ API (American Petroleum Institute) threads, for example, to enable it to be coupled with the end of a drill string. Flats 22 on the exterior of a solid circular mid-section 23 of the head piece 11 enable it to be held or turned with a wrench. Extending axially from the mid-section 23 is a cylindrical stub shaft or pin 24. At its distal or free end, the shaft 24 has external machine threads 26. At its fixed end where it is joined with the mid-section 23, the shaft 24 has a large radius, smooth fillet 27 that, as will be discussed, serves to avoid the existence of a stress riser at this juncture. The thrust washer 17 has a bore 28 that slips over the shaft 24 and a throat area 29 that closely compliments the shaft fillet 27. The thrust washer 17 has a radial face 30 on its side opposite the throat 29. An annular skirt or collar 31 extends axially from the mid-section 23 concentrically about the shaft fillet 27. The collar 31 is machined or otherwise formed with an annular pocket 32 with an inside surface 33 that is slightly conical, increasing in diameter with increasing distance from the mid-section 23. Each end of the pocket 32 has a radial shoulder 34, 36.

The bearing assemblies 18 are assembled on the shaft 24 facing in opposite directions. Preferably, these assemblies 18 are essentially identical to afford both high tensile and compressive bearing strength and economies of standardization. Each bearing assembly 18 is of the spherical roller thrust bearing type with rollers 41, inner races 42 and outer races 43 each having respective spherical surfaces 44, 45 and 46. The bearing assemblies 18 are retained axially on the shaft 24 by the hex nut 19 threaded onto the threads 26. A washer 49 with an internal key 50 that fits into an axial slot 47 along the threads 26 is interposed between a radial face 48 of the inner race 42 and the nut 19 to prevent the nut from unintentionally loosening. The radial face 48 of the inner race 42 of the other bearing assembly 18 abuts the radial face 30 of the thrust washer 17.

The shell body 12 has the general form of a cylindrical tube. At an end 51 adjacent the head piece collar 31, the shell body 12 is machined or otherwise formed with an annular pocket 52 having a slightly tapered conical surface 53 increasing in diameter in the direction towards the collar 31 and two generally radial shoulders 54, 55 facing one another.

A radial hole or port 57 is drilled through the wall of the shell body 12 and is provided with tapered pipe threads to receive a socket head pipe plug 58. Blind holes 59 are formed in the outer surface of the shell body 12 to enable it to be gripped by a suitable wrench or similar device to turn it or prevent it from turning during refurbishment. At its mid-length, the shell body 12 has an internal shoulder 61 with oppositely facing radial abutment surfaces 63 that abut respective radial faces 64 of the outer races 43 of the bearing assemblies 18. The shell body 12 is proportioned so that when the bearing assemblies 18 are adequately restrained by tightening of the nut 19 on the shaft threads 26, there is a small clearance gap 66 between the shell body 12 and collar 31.

At its opposite end, the shell body 12 has internal machine threads 67 to receive complimentary external threads 68 on an extension 69 of the tail piece 13.

In assembly, the tail piece extension 69 is tightened into the threads 67 until respective radial faces 71, 72 of the shell and tail piece abut. At the periphery of these faces, the shell body 12 and tail piece 13 are chamfered so as to form a small, shallow circumferential groove 73 around the surfaces. The extension 69 surrounds the shaft nut 19 so that, in effect, the nut and part of the shaft 24 nest in a blind cavity within the extension. Wrenching flats 74 are formed on the exterior of the tail piece 13. A pair of spaced supports 76 extend axially from a main portion of the tail piece 13. The supports 76 have aligned holes 77 perpendicular to the axis 14 such that the supports 76 form a clevis to receive a pin 78. Between the clevis supports 76, the main portion of the tail piece 13 has a through hole 79 with female pipe threads to accept a grease fitting or a relief valve 81.

The metal face seal assembly 16 seals the gap 66 between the head piece 11 and shell body 12 while allowing relative rotation between these members. The seal assembly 16 comprises a pair of matched metal sealing rings 87 and two elastomeric load rings or O-rings 88. Tapered surfaces 33, 53 in the head piece collar 31 and shell body, respectively, and tapered surfaces 89 of the rings 87 bias the elastomeric rings 88 towards their respective seal rings 87 and the seal rings together so that their radial faces 90 provide a dynamic or rotational seal between these rings. The elastomeric load rings 88 provide a static seal between the rings and the head piece 11 and shell body 12. The metal rings 87 and elastomeric load rings 88 can be of a type marketed by Caterpillar, Inc.

With the parts assembled as shown in FIG. 1, the tail piece 13 and shell body 12, which are preferably fabricated from suitable steel, are mutually interlocked by tack welding these members together. This can be accomplished, for example, by laying three equally spaced weld beads 91 of 308 stainless filler of an approximate length of 12 mm in the peripheral groove 73 formed by their respective bevels or chamfers. Any excessive bead height beyond the periphery of these members can be ground off.

The bearing cavity, existing primarily within the shell body 12, and to a limited degree the head piece collar 31 and tail piece extension 69 is filled with suitable grease through a grease fitting threaded into the hole 79. The head piece 11 is rotated relative to the tail piece 13 while grease is injected. When grease exits the port 57 without air, the port is plugged with the plug 58 and the grease fitting is replaced by a suitable commercially available relief valve 81. The relief valve 81 can be provisionally covered with a vent plug inserted into the axial hole 79 after assembly of the relief valve.

In use, the swivel assembly 10 couples a pipe string, threaded into the head piece, to a product coupled to the tail piece 13 by the pin 78. The product, which can be a communications cable, power cable, gas line, or conduit, for example, is installed by pulling the pipe string back out of the hole. This action often involves high tensile forces because of drag on the product line. The hole often deviates from a straight line because of obstacles in the original path of the drill. These deviations or turns in the hole can result in very high bending force loads being imposed on the swivel assembly 10. These bending loads, coupled with high tensile loads, can severely stress the shaft 24, particularly at its base where it joins the mid-section 23 of the head piece 11. The fillet 27 at the base of the shaft 24 avoids stress riser phenomena in this area and greatly improves the resistance of the shaft to mechanical failure at this point. Unavoidable bending deflections of the shaft 24 do not normally result in excessive stress in the bearing assemblies 18 because of their inherent ability to self-align to the local deflections in the shaft. The seal assembly 16, because it seals on a radial plane, can readily tolerate a limited eccentricity of the shell body 12 relative to the head piece 11 at this location due to bending of the shaft 24. The pressure relief valve 81 allows limited release of lubricant from the bearing cavity if excessive heat build-up occurs in the swivel assembly 10 so as to protect the seal assembly 16 from excessive pressure.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A swivel assembly for installing product in a bore formed with horizontal directional drilling processes comprising a head piece and a tail piece, thrust bearings disposed between the head and tail pieces, and a shell body connected to the tail piece and surrounding the bearing assemblies, the head piece having an integral axially extending shaft, said bearings having their inner races assembled on said shaft and their outer races supported in said shell body, the bearings rotationally supporting the tail piece on the head piece with both radial load capacity and axial IA-directional load capacity, the head piece having a main portion, the shaft being integral with and extending axially from said main portion, an integral smoothly curved fillet at the juncture between the shaft and the main portion representing the first change in radius of the shaft and main portion along an axial direction away from an adjacent one of said bearings and extending radially outward substantially from a radius of the shaft in said adjacent one of said bearings to a radially outer extent through a radial distance that is larger than one-half of the radius of the shaft in said adjacent bearing to thereby avoid a stress riser condition at said juncture.

2. A swivel assembly as set forth in claim 1, including a thrust washer assembled on said shaft between said adjacent one of said bearings and said main portion, said thrust washer being arranged to bear the axial thrust load on said adjacent one of said bearings.

3. A swivel assembly as set forth in claim 2, wherein said thrust washer has a throat with a configuration that closely compliments said fillet.

4. A swivel assembly as set forth in claim 3, including a seal assembly surrounding a portion of said thrust washer, said seal assembly producing a dynamic seal between the head piece and the shell body.

5. A swivel assembly as set forth in claim 4, wherein said seal assembly includes metal-to-metal face sealing surfaces.

* * * * *

UNITED STATES PATENT AND TRADEMARK OFFICE
CERTIFICATE OF CORRECTION

PATENT NO.    : 6,637,969 B2
DATED         : October 28, 2003
INVENTOR(S)   : Clayton Crane and David Long It is certified that error appears in the above-identified patent and that said Letters Patent is hereby corrected as shown below:

<u>Column 4,</u>
Line 55, please delete "IA-directional", and insert therefor -- bi-directional --.

Signed and Sealed this

Second Day of March, 2004

JON W. DUDAS
*Acting Director of the United States Patent and Trademark Office*